(12) United States Patent
Porte et al.

(10) Patent No.: US 8,651,925 B2
(45) Date of Patent: Feb. 18, 2014

(54) VENTILATING AIR INTAKE ARRANGEMENT WITH MOBILE CLOSING DEVICE

(75) Inventors: Alain Porte, Colomiers (FR); Damien Prat, Colomiers (FR)

(73) Assignee: Airbus Operations SAS, Toulouse (FR)

( * ) Notice: Subject to any disclaimer, the term of this patent is extended or adjusted under 35 U.S.C. 154(b) by 1814 days.

(21) Appl. No.: 11/722,153

(22) PCT Filed: Dec. 13, 2005

(86) PCT No.: PCT/FR2005/003108
§ 371 (c)(1),
(2), (4) Date: Jun. 19, 2007

(87) PCT Pub. No.: WO2006/067299
PCT Pub. Date: Jun. 29, 2006

(65) Prior Publication Data
US 2009/0111370 A1    Apr. 30, 2009

(30) Foreign Application Priority Data
Dec. 20, 2004    (FR) ..................... 04 13555

(51) Int. Cl.
*B64D 13/00*    (2006.01)
*F02C 7/14*    (2006.01)
*B64C 1/38*    (2006.01)

(52) U.S. Cl.
USPC .............................. 454/76; 60/39.02; 244/130

(58) Field of Classification Search
USPC ................... 454/75–76, 284, 33, 6; 244/130; 60/39.02
See application file for complete search history.

(56) References Cited

U.S. PATENT DOCUMENTS

| | | | |
|---|---|---|---|
| 3,533,238 A * | 10/1970 | Marvin | ............................ 60/233 |
| 3,915,413 A | 10/1975 | Sargisson et al. | |
| 4,641,678 A | 2/1987 | Haas et al. | |
| 5,226,455 A | 7/1993 | Dupont et al. | |
| 6,231,006 B1 | 5/2001 | Gruensfelder et al. | |

FOREIGN PATENT DOCUMENTS

| | | |
|---|---|---|
| BE | 464754 | 5/1946 |
| FR | 2589517 | 5/1987 |

OTHER PUBLICATIONS

PCT International Search Report dated Mar. 29, 2006 with English translation.

* cited by examiner

*Primary Examiner* — Steven B McAllister
*Assistant Examiner* — Helena Kosanovic
(74) *Attorney, Agent, or Firm* — Dickinson Wright PLLC (57) ABSTRACT

Disclosed is a ventilating air intake arrangement of an aircraft. The arrangement includes at least one air duct connected to an air intake orifice. At least one confined zone connects with the air duct and the air intake orifice, and the confined zone is configured in a manner in which outside air enters through the air intake orifice. A controllable mobile element modifies the flow of air entering the confined zone by varying a cross section of the air duct. A control unit is used to control the controllable mobile element, with the control unit being arranged so as to control the controllable mobile element to vary the cross section of the at least one air duct as a function of speed and altitude of the aircraft.

6 Claims, 7 Drawing Sheets

VENTILATING AIR INTAKE ARRANGEMENT WITH MOBILE CLOSING DEVICE

FIELD OF THE INVENTION

The present invention relates to a ventilating air intake arrangement comprising an air duct with an air intake orifice, designed to ventilate at least one confined zone in an aircraft.

BACKGROUND OF THE INVENTION

It is known that such ventilating air intake arrangements are widely used in the aeronautical field for the purposes of replacing the air in a confined zone containing heat-sensitive equipment and/or hazardous ambient locations, of the inflammable or detonating type, for which it is necessary to provide continuous ventilation of the zone in order to prevent any risk of malfunction of the equipment or of nearby incident.

Such is the case in particular with many mechanical and/or electrical devices provided in the annular confined space or zone between the nacelle and the outer casing of the fan and the compressors of an aircraft turbojet. These devices, such as, for example, the fadec (full authority digital engine control), the gearbox, the engine oil tank, the fluidic components, etc., usually attached all around the outer casing and thus situated in the confined zone, are ventilated by outside air entering the arrangement via the air intake orifice to pass through the duct made in the nacelle and to diffuse, at the exit of the duct, in the confined zone. These devices, like the oil or other vapors emanating from this space, are ventilated by cool outside air diffused by the air duct, which helps to ensure that they operate correctly.

To satisfy the applicable regulation, which requires an appropriate rate of air replacement per unit of time of the confined zone in question, the air duct of the arrangement has a predetermined cross section allowing a sufficient quantity of air to circulate in the duct to ensure, at its exit, the replacement of air of the confined zone containing the devices to be ventilated.

However, the cooling devices and the vapors to be expelled are not ventilated optimally by the known air intake arrangements.

Specifically, in these arrangements, if the outside air entering upstream via the air intake orifice into the duct with a predetermined cross section of the arrangement and exiting downstream of the latter is sufficient to properly ventilate the devices when the aircraft is in the taxiing phase, in the take-off phase or in the holding phase, hence at low speed, on the other hand, when the aircraft is in the flight cruising phase at a maximum speed and altitude, the quantity of air or the flow of air exiting the duct of the arrangement toward the zone to be ventilated is too great. For this reason, the devices are overcooled because the temperature of the outside air is extremely low at this cruising altitude, which may lead to malfunctions. Furthermore, measures have made it possible to establish that, in this flight phase, the air circulating in the confined zone via the duct of the arrangement was replaced twice more than necessary, such that the fadec, in particular, is overcooled, which may impair its proper operation.

The object of the present invention is to remedy these disadvantages, and relates to an air intake arrangement whose design makes it possible to provide an optimal ventilation of a confined zone such as the one hereinabove of a turbojet, but which may also be a lights zone or a belly fairing zone or, in a general manner, any zone more or less enclosed and heat sensitive of a vehicle for which air replacement is desired.

SUMMARY OF THE INVENTION

Accordingly, the ventilating air intake arrangement comprising at least one air duct with an air intake orifice, designed to ventilate at least one confined zone in an aircraft with outside air entering upstream, through said air intake orifice, into said duct and exiting downstream of the latter toward said zone to be ventilated, said air intake arrangement comprising controllable mobile element closing means, associated with said duct, and means of controlling said controllable mobile element making it possible to vary the cross section of said duct, is notable in that said control means comprise a variable volume reservoir:
   that is connected to said controllable mobile element, and
   that receives the total pressure exerted by the air on said aircraft,
so that the cross section of said duct varies according to the speed and altitude of said aircraft.

Thus, thanks to the invention, it is possible to vary automatically the cross section of the duct of the air intake arrangement by the controllable mobile element closing means and modify, according to the flight phases of the aircraft, the flow of air entering the confined zone and, therefore, better ventilate the devices concerned.

For example, during aircraft cruising flight (maximum speed and altitude), the cross section of the duct of the arrangement is advantageously reduced by the actuation of the controllable mobile element of the closing means to ventilate the devices reasonably and thus prevent overcooling of the latter. On the other hand, when the aircraft is taxiing or in the take-off phase (low speed), the cross section of the duct is opened to the maximum by the retraction of the mobile element of said closing means, to thus cause a maximum quantity of air to circulate in the duct and properly ventilate the devices situated in the confined zone.

Thus, thanks to the invention, the quantity of air taken in by the ventilating air intake arrangement is adapted to each flight phase, which minimizes the performance penalty of the aircraft due to ventilation.

Said variable volume reservoir may be a cylinder/piston assembly, a bladder, a bellows, etc. that receives the total pressure exerted by the air on said aircraft and that is connected to said controllable mobile element. This total pressure is taken in on the aircraft via a pressure intake orifice and, advantageously, this pressure intake orifice is placed in the vicinity of said air intake orifice.

Preferably, at least one of the positions of the mobile element of said closing means, defining said minimum cross section and said maximum cross section, is defined by a stop.

Said controllable mobile element closing means may be situated at the entrance of said duct, at said air intake orifice, or at the exit of said duct, in a diffuser extending the latter and directing the air toward the zone to be ventilated.

Said mobile element of the closing means may be in several forms. For example, it may consist of an elastic plate, deformed against its own elasticity by said control means.

As a variant, said mobile element closing means may comprise at least one pivoting flap with a controllable rotation shaft contained in its plane and perpendicular to said air duct, so that said flap may pivot between two limit positions for which said cross sections of said duct are respectively minimal and maximal.

When said means are provided at the entrance of said duct, said air intake orifice may have a rectangular cross section delimited by opposite, two by two, side walls and said flap is then arranged at the rear edge of said orifice relative to the flow of air entering the latter, its rotation shaft being parallel to said rear edge.

Thus, when said flap is in a position extending said rear edge of the orifice while partially closing it, the cross section of the duct is minimal, allowing a minimum flow of ventilating air toward the annular space, and when it is in a position protruding outward relative to the orifice, the cross section of the duct is then maximal, allowing a maximum flow of ventilating air toward said space.

Advantageously, around said air intake orifice, a rectangular frame is fitted whose rear side overlaps the longitudinal rear edge of the pivoting flap and serves as a stop for the latter when it occupies one or other of its two limit positions. In addition, said frame which borders said orifice may support the rotary shaft of said pivoting flap. Thus, the frame and the flap form a one-piece assembly that may be fitted around said orifice.

In another embodiment, said mobile element closing means comprise at least one rotary throttle valve with a controllable rotation shaft perpendicular to said air duct and passing in its centre, so that, when said throttle valve is in a position parallel to said duct, the cross section of the latter is maximal and, when said throttle valve is in a position perpendicular to said duct, partially closing it, its cross section is minimal.

In this case, said throttle valve is arranged at said air diffuser of the duct and its controllable rotary shaft is supported at its ends by opposite side walls of said diffuser.

Preferably, stops are also provided there in said diffuser to mark the two respectively parallel and perpendicular limit positions of said throttle valve relative to said duct.

The figures of the appended drawing will clearly explain how the invention can be achieved. In these figures, identical reference numbers indicate similar elements.

DETAILED DESCRIPTION OF THE INVENTION

Figure 1:
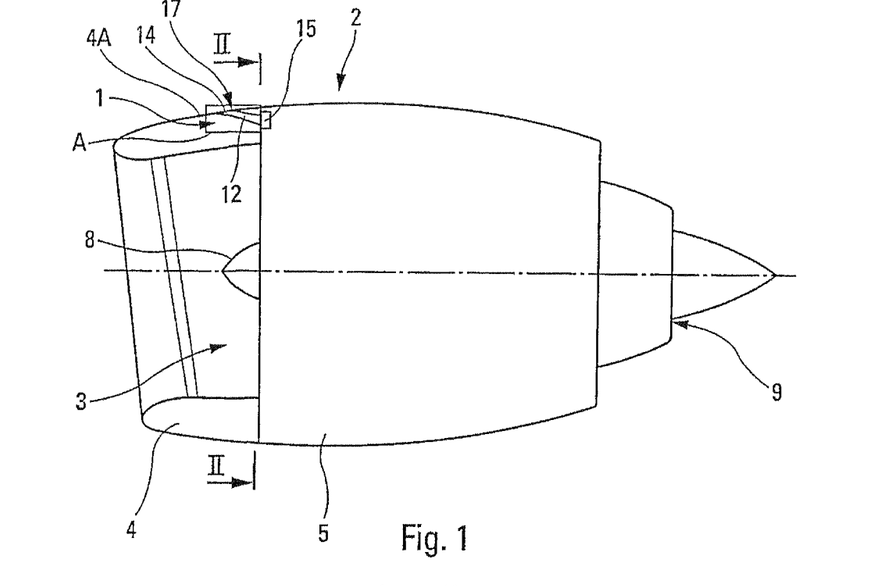
FIG. 1 represents schematically and partially in section the nacelle of a turbojet furnished with a ventilating air intake arrangement sketched in the frame A, according to the invention.

The ventilating air intake arrangement 1, according to the invention and delimited by a rectangle A in FIG. 1, is provided in a nacelle 2 of an aircraft engine 3, such as a turbojet. As shown schematically in FIG. 1, the nacelle 2 comprises, as usual, a front air intake portion 4 to deliver air to the engine, an intermediate portion 5 surrounding the outer casing 7 of the fan 8, the engine compressors and the combustion chamber and the turbine, from which emerges the outer casing of the nozzle 9 and its cone.

Figure 2:
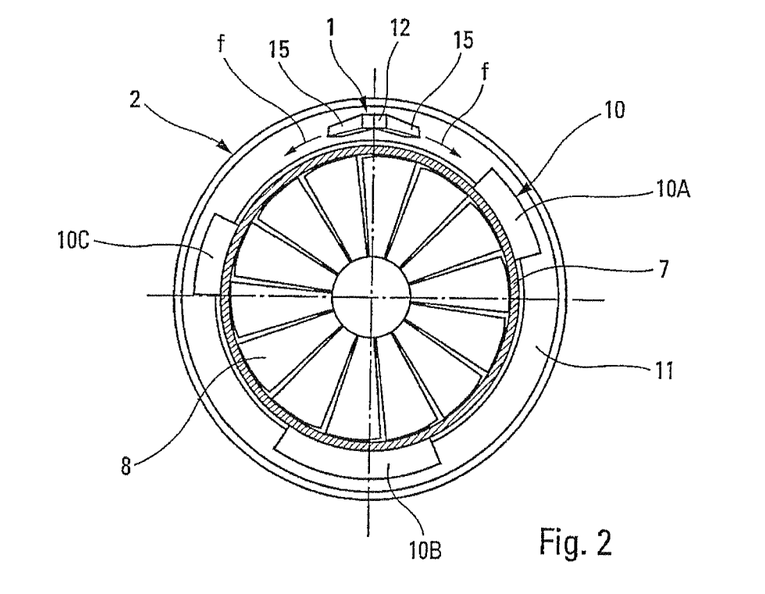
FIG. 2 is a front view, partially in section along the line II-II of FIG. 1, of said nacelle of the turbojet, showing the various devices to be ventilated.

Various mechanical and/or electric items of equipment or devices 10 are fitted to the outer casing 7 of the fan and of the compressors, that is to say in the annular space or zone 11 confined between the nacelle 2 and the outer casing 7 of the engine 3. FIG. 2 represents symbolically certain of the devices 10 that are in this zone 11, that is to say the fadec 10A, the gearbox 10B and the engine oil reservoir 10C.

The replacement of the air in this confined zone 11 to keep the devices 10 in an appropriate temperature range and allow them to operate correctly is provided by the ventilating air intake arrangement 1 that is situated at the top of the front portion 4 of the nacelle 2 and comprises, for this purpose, an air duct 12 made in the structural wall of the front portion 4 of the nacelle and connecting the outside air with the confined zone 11. For this, the duct 12 has an air intake orifice 14 upstream and, downstream, a diffuser 15 (see also FIGS. 5, 8, 9, 13 and 15) connected with said space opening into the central portion 5 of the nacelle.

To optimize the ventilation, the air duct 12 is slightly inclined relative to the outer surface 4A of the portion 4 of the nacelle and is directed downstream toward the longitudinal axis of the engine, to take in and to best conduct the cool outside air into the duct and then discharge it tangentially via the double-outlet diffuser 15, as shown by the arrows f in FIG. 2, of both sides of the annular confined space 11.

In the examples shown, the general profile of the duct 12 of the arrangement 1 is slightly progressive, that is to say that after having converged following its tangential air intake orifice 14, it diverges slightly toward the diffuser 15 and its cross section, delimited by side walls 16, is rectangular.

According to the present invention, this cross section of the duct 12 is rendered adjustable thanks to controllable mobile element closing means 17. In this manner, it is possible therefore to decrease or increase the quantity or the flow of ventilating air circulating in the duct 12 toward the confined zone 11, as a function of the speed and altitude of the aircraft, as is illustrated schematically in FIGS. 3 and 4.

Figure 3:
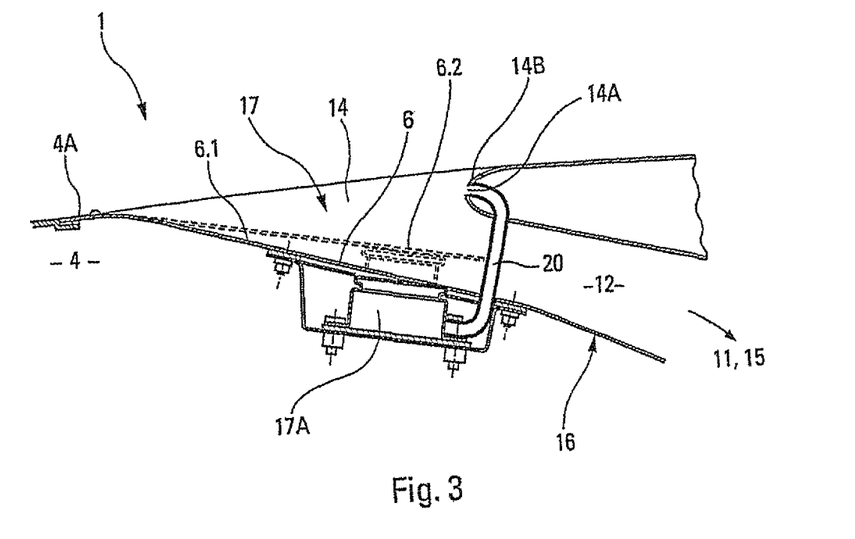
FIGS. 3 and 4 illustrate two variants of the arrangement according to the present invention, with different control means.
Figure 4:
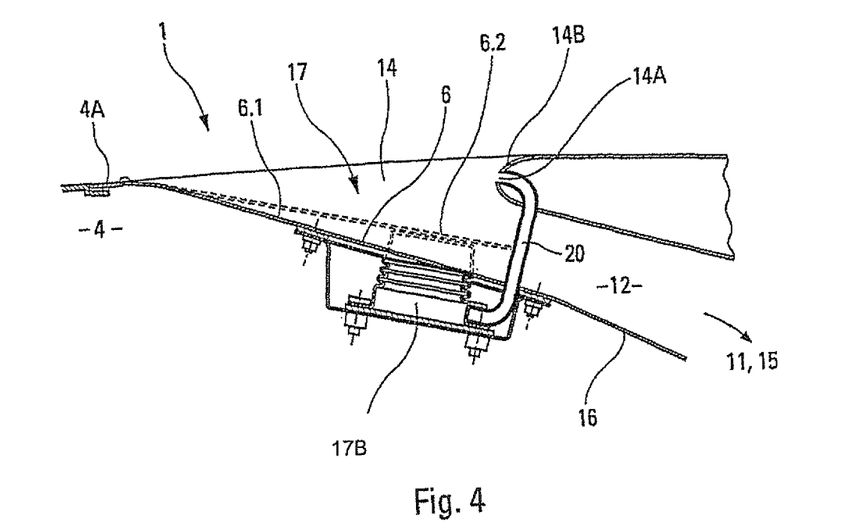

In these figures, said controllable mobile element of the closing means 17 is formed by an elastic plate 6 placed in the orifice 14 over its whole width and attached to the outer surface 4A of the front portion 4 of the nacelle. In addition, said closing means 17 shown by FIGS. 3 and 4 comprise control means 17A or 17B, respectively, capable of acting automatically on said elastic plate 6 against its own elasticity. The control means 17A of FIG. 3 is a pneumatic cylinder, while the control means 17B in FIG. 4 is a bladder or bellows. The chamber of said pneumatic cylinder 17A and the bellows 17B are in communication, by means of a conduit 20, with a pressure intake orifice 14A provided on the periphery 14B of the orifice 14 and taking in the total pressure (or pitot pressure) of the air on the nacelle 2 of the aircraft engine 3. Naturally, in order not to disrupt the air flow inside the duct 12, the conduit 20 may pass on the outside of the latter.

When this total pressure is low, the cylinder 17A and the bellows 17B are in a retracted position and the elastic plate 6 occupies a position 6.1, butting against the cylinder 17A or the bellows 17B, extending the walls of the air intake orifice 14 and/or of the duct 12. Therefore this duct 12 then has a maximum cross section allowing a maximum air flow toward the zone 11.

On the other hand, when the total pressure increases, the cylinder 17A and the bellows 17B dilate and push the elastic plate 6 which then protrudes into the air intake orifice 14 and/or the duct 12. Thus, depending on the value of said total pressure, the plate 6 may take a plurality of protruding positions 6.2 partially closing the duct 12 in consequence. When the total pressure reaches its maximum value, corresponding to the maximum speed and the maximum altitude of the aircraft, the plate 6 closes the duct 12, so that the latter has a minimum cross section allowing a minimum air flow toward the zone 11.

Figure 6:
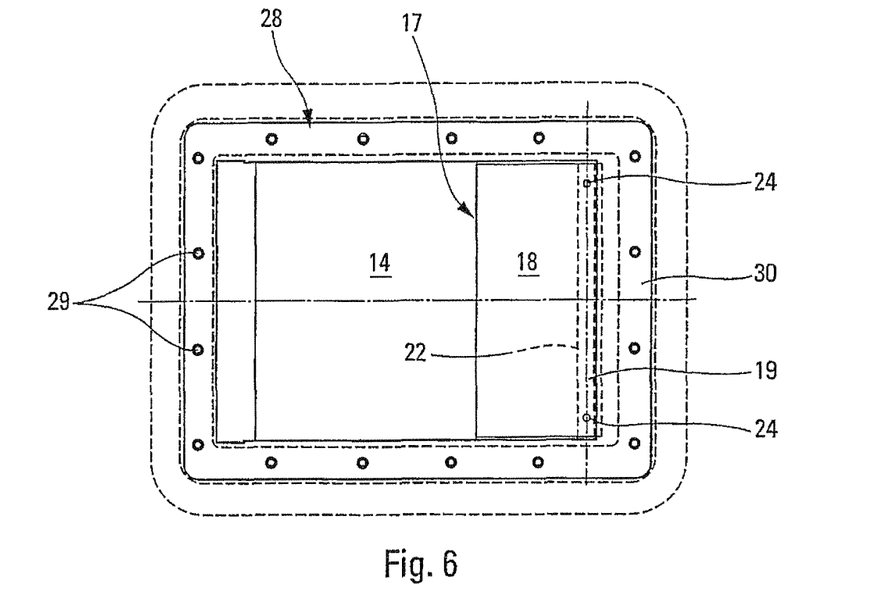
FIG. 6 is a top view, along the arrow F of FIG. 5, of said arrangement.
Figure 7:
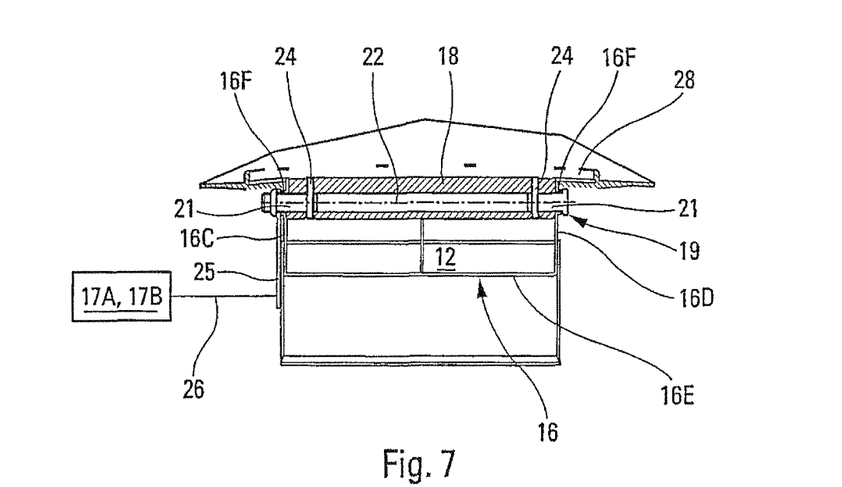
FIG. 7 is a cross section passing through the flap of said arrangement, along the line VII-VII of FIG. 5.
Figure 8:
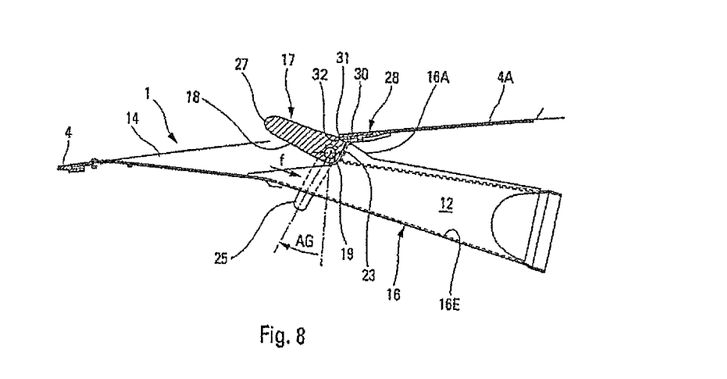
FIG. 8 is a section of the arrangement similar to FIG. 5 in a position allowing a maximum intake of ventilating air.

In the embodiment shown in FIGS. 5 to 8, the controllable mobile element of the closing means 17 of the arrangement 1 is defined by a pivoting flap 18 situated at the rectangular air intake orifice 14 of the duct 12 and fixedly attached to a rotation shaft 19 that can, by means of the control means 17A or 17B, rotate the flap 18 between two distinct limit positions for which the cross section of said duct 12 at the orifice 14 is minimal (FIG. 5) or maximal (FIG. 8).

In particular, the flap 18 is arranged, relative to the direction of flow of the outside air in the duct (arrow f, FIG. 3), ahead of the rear edge 16A of the rectangular orifice 14, forming the connection between the outer surface 4A of the portion 4 of the nacelle and the corresponding wall 16B (top on FIG. 5) of the duct. The rotation shaft 19 of the flap is parallel to the rear edge 16A and, in this example, consists of two identical end-pieces 21 housed at the respective ends of an axial passageway 22 provided in the longitudinal edge 23 of the flap, turned in parallel toward the rear edge 16A of the air intake orifice 14.

As shown in particular in FIGS. 6 and 7, the length of the flap 18 corresponds substantially to the width of the rectangular orifice 14 and its width is naturally less than the length of said orifice for a partial closure of the latter. The end-pieces 21 are engaged respectively via holes 16F in the opposite side walls 16C and 16D of the duct and thus support said flap. To provide the rotational connection of the two end-pieces 21 with the flap 18, two pins or dowels 24 radially traverse the end-pieces and the flap. And to provide the pivoting of the flap 18 between its two limit positions, and any other intermediate position, a lever 25 is provided outside the air duct 12 and is fixedly attached in rotation to one of the end-pieces 21. This lever 25 is connected, via a connection 26, to the control means 17A or 17B.

Figure 5:
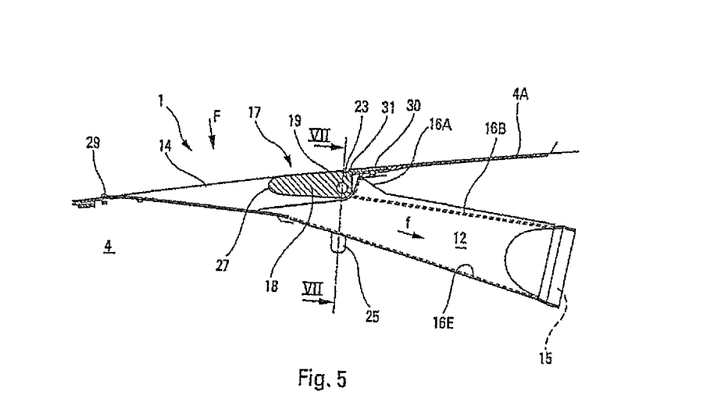
FIG. 5 is an enlarged longitudinal section of another embodiment with pivoting flap of said arrangement of FIG. 1, in a position allowing a minimum intake of ventilating air toward said space to be ventilated.

In the position illustrated in FIG. 5, it can be seen that the flap 18, which extends the rear edge 16A, is contained in the plane of the air intake orifice 14 and thus partially closes the latter. In this way, the air passage cross section of the duct, at this point, delimited by the free longitudinal edge 27 of the flap and by the bottom wall 16E and side walls 16C and 16D of the duct, is reduced and in this case is minimal.

Such a configuration of the flap 18 reducing the cross section of the duct 12 then allows a minimum air flow toward the zone 11 to be ventilated containing the devices 10 and is particularly recommended when the aircraft is in cruising flight, that is to say at high altitude and high speed, preventing the devices 10 from being overcooled.

Note, furthermore, in FIGS. 5 to 7, that, all around the air intake orifice 14 a rectangular frame 28 is fitted by screws 29, thus delimiting said orifice. The outer rear side 30 of the frame, attached to the rear edge 16A, partly overlaps the longitudinal edge 23 of the flap 18 and defines, as shown in FIG. 5, a stop 31 marking the limit position occupied by the flap and thus preventing it from pivoting further toward the left in FIG. 5 and reducing by too much the cross section of the air duct 12.

The frame 28 which borders the orifice 14 may furthermore support, via its lateral sides parallel to the walls 16C, 16D, the rotary shaft 19 of the pivoting flap 18 and constitute, with the latter, a one-piece assembly fitted by screwing to the portion 4 of the nacelle.

As shown in FIG. 8, under the action of the control means 17A or 17B and via the connection 26, the lever 25 has pivoted angularly in the clockwise direction (angle AG), moving in its rotation the flap 18 by means of the end-pieces 21 and the pins 24. The flap 18 then protrudes outward relative to the air intake orifice 14 and further opens the latter, so that the cross section of the duct 12 increases and is at maximum in this other limit position of the flap, allowing a maximum air flow toward the zone 11 to be ventilated containing the devices. Again, this limit position of the flap is marked by the contact of a notch 32 provided on the outer face of the edge 23 of the flap 18, with the rear side 30 of the frame 28, defining the stop 31. Such a configuration of the flap 18 is particularly desirable when the speed of the aircraft is low, particularly during the taxiing, take-off or holding phases. The air in the confined zone is thus replaced several times per unit of time.

Naturally, thanks to the control means 17A or 17B, the air flow diffused into the zone 11 can be modulated between the two maximum and minimum values according to the value of the total pressure taken in by the orifice 14A.

In the embodiment shown in FIGS. 9 to 12, the controllable mobile element closing means 17 of the arrangement 1 are defined by a rotary throttle valve 35 whose rotation shaft 36 is not only perpendicular to said duct 12 but also horizontal relative to the latter and passes in its centre.

Figures 9, 10:
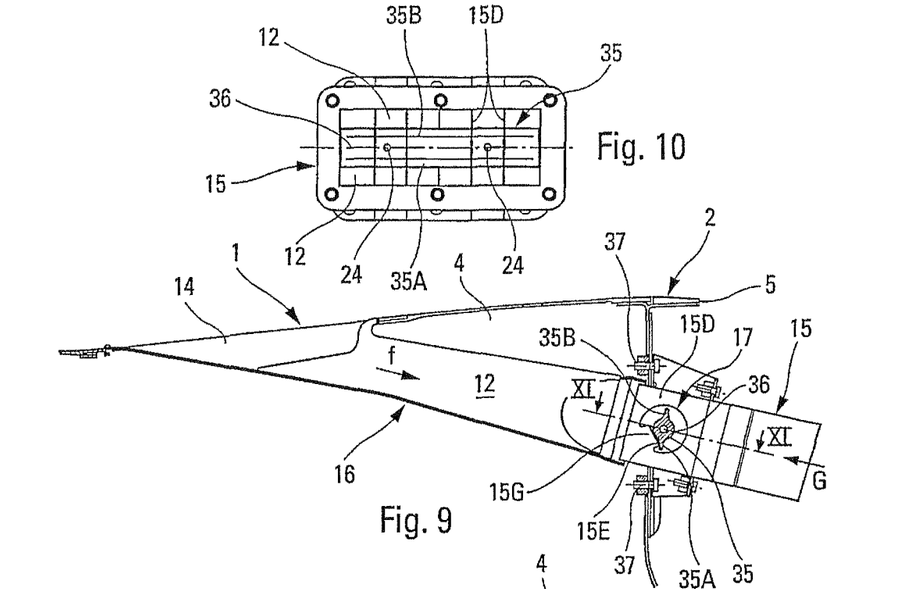
FIG. 9 is a longitudinal section of yet another embodiment with a horizontal throttle valve of said arrangement, in a position allowing a minimum intake of ventilating air.
FIGS. 10 and 11 are respectively an end view along the arrow G and a view in section along the line XI-XI of said arrangement of FIG. 9.
Figure 11:
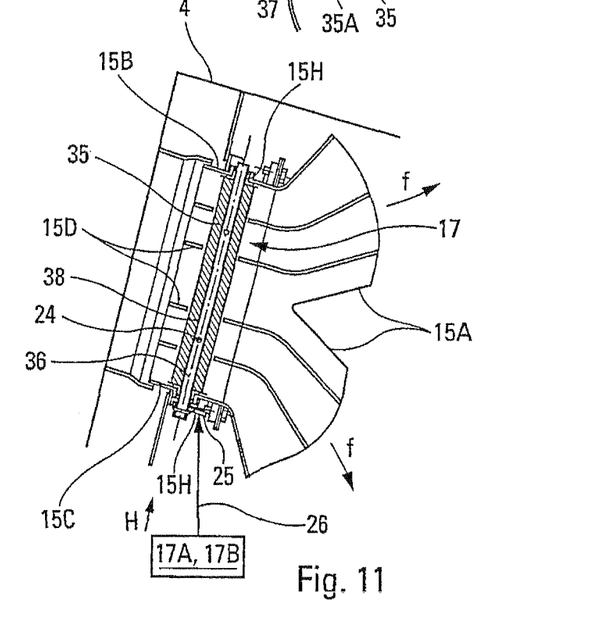

More particularly, the rotary throttle valve 35 is mounted in the diffuser 15 of the duct 12, that is to say at its exit and, as shown in FIGS. 9 and 10, the diffuser is attached to the rear of the portion 4 of the nacelle 2 by fastening members 37 such as screws, and its diverging double exit 15A represented in FIG. 11 diffuses the cool air toward the annular space 11, of both sides of the latter.

Structurally, the rotary shaft 36 of the throttle valve traverses a central passageway 38 provided in the body of the throttle valve and is supported at its ends by the opposite side walls 15B, 15C of the diffuser, via matching holes 15H, made in the latter, as shown in FIG. 11. In a manner similar to the previous embodiment, pins or dowels 24 provide the rotational connection of the shaft 36 with the throttle valve 35.

Furthermore it can be seen in FIGS. 9 to 11 that the diffuser 15 comprises, on the inside, intermediate separating partitions 15D through which the body of the throttle valve 35 passes axially. In addition to the fact that they make it possible to stiffen the diffuser and best channel the cool air toward the annular space 11, the partitions 15D define stops 15E, 15F for the two limit positions that may be occupied by the throttle valve 35.

For example, in FIGS. 9 to 11, the rotary throttle valve is, under the action of the control means 17A or 17B, connected by the connection 26 to the external lever 25 fixedly attached to the shaft 36 (FIG. 11) in a position perpendicular to the air duct 12, so that the cross section of the latter is reduced and minimal, since it is partially closed by the wings 35A, 35B of the throttle valve 35. As for the embodiment shown in FIGS. 5 to 7, such a configuration is recommended when the aircraft is in cruising flight, for the reasons previously given. In this limit position, one of the wings 35A of the throttle valve then presses against one of the sides of a lug 15G provided coaxially in each intermediate partition 15D, thus marking said position. This side of each lug then defines the stop 15E.

Dimensionally, as shown in particular in FIGS. 10 and 11, the width of the throttle valve is substantially equal to the corresponding horizontal dimension of the rectangular duct, while its height (FIGS. 9 and 10) is less than the other, vertical, dimension of the duct, so as to allow a predetermined minimum air flow over and under the wings of the throttle valve toward the annular space, when it occupies the position illustrated in FIGS. 10 and 11, that is perpendicular to the flow f of the air in the duct 12.

Figure 12:
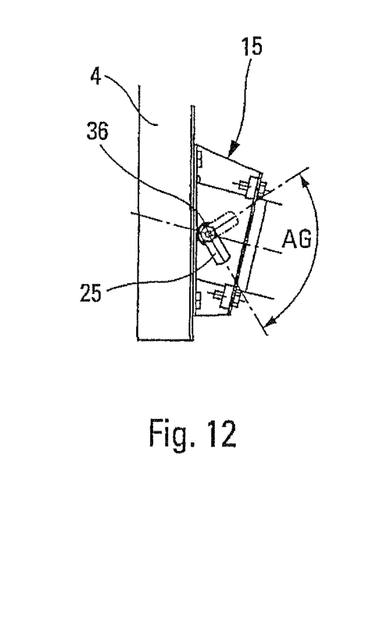
FIG. 12 is a side view of the diffuser along the arrow H of FIG. 11.
Figure 13:
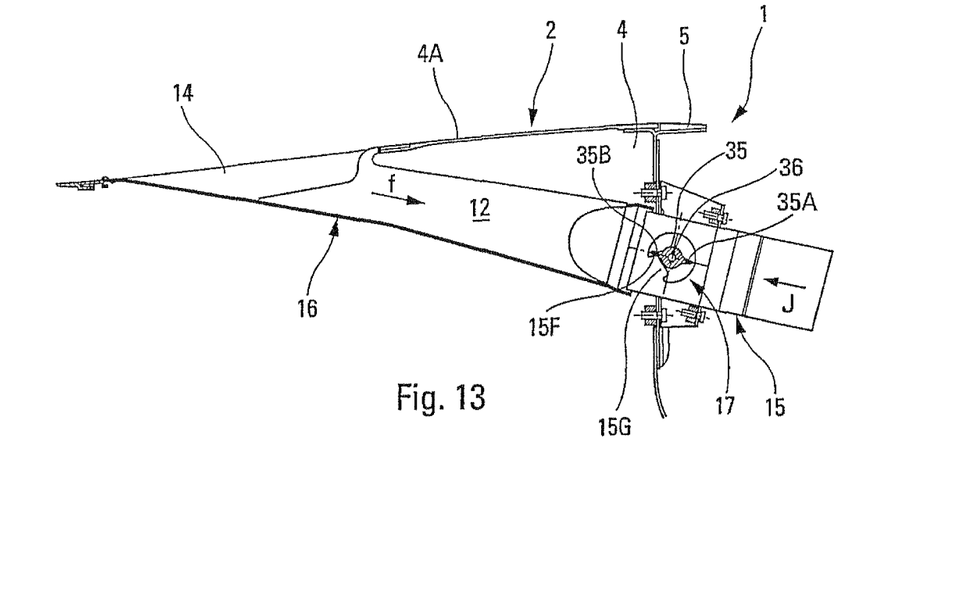
FIG. 13 is a section of the arrangement similar to FIG. 9, in a position allowing a maximum intake of ventilating air.
Figure 14:
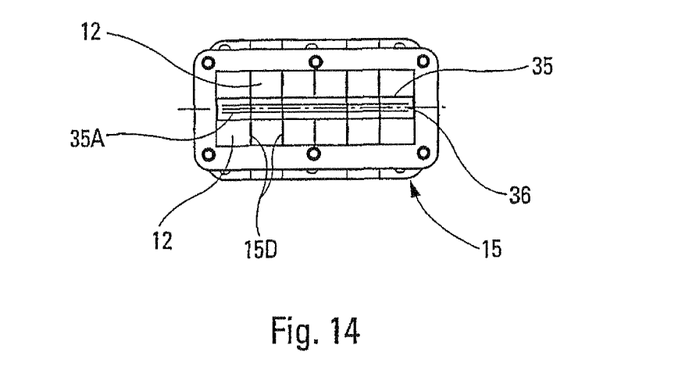
FIG. 14 is an end view of said arrangement along the arrow J of FIG. 13.

In the other of its limit positions illustrated with respect to FIGS. 11 and 12, under the action of the control means 17A or 17B having rotated the lever 25 90° (angle AG in FIG. 12) and therefore the shaft 36, the throttle valve 35 is in a horizontal position, parallel to the air duct 12, so that the cross section of the latter is then maximal. The other wing 352 of the throttle valve, which has rotated 90°, is then pressed against the other side of the lug 15G provided in each of the intermediate partitions 15D, this other side defining the stop 15F. A maximum air flow then passes through the diffuser 15 of the duct to ventilate in this way the sensitive devices 10 and other dangerous vapors that are in the annular space 11, particularly when the speed of the aircraft is low.

Figures 15, 16, 17, 19:
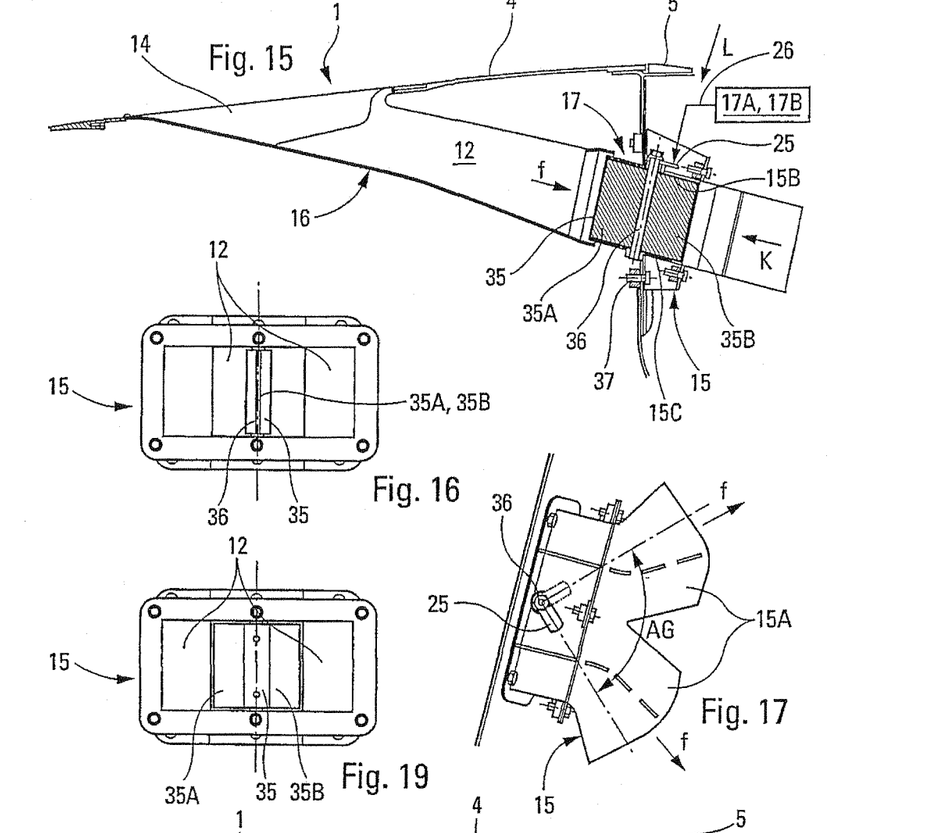
FIG. 15 is a longitudinal section of a variant embodiment with vertical throttle valve of said arrangement, in a position allowing a maximum intake of ventilating air.
FIGS. 16 and 17 are respectively an end view along the arrow K and a top view along the arrow L of said arrangement of FIG. 15.
FIG. 19 is an end view of said arrangement along the arrow M of FIG. 18.

In the variant embodiment shown in FIGS. 15 to 17, the controllable mobile element closing means 17 of the arrangement 1 are also defined by a rotary throttle valve 35 but its rotation shaft 36, that is still perpendicular to said duct 12, is then arranged vertically relative to the latter and passes in its centre.

Figure 18:
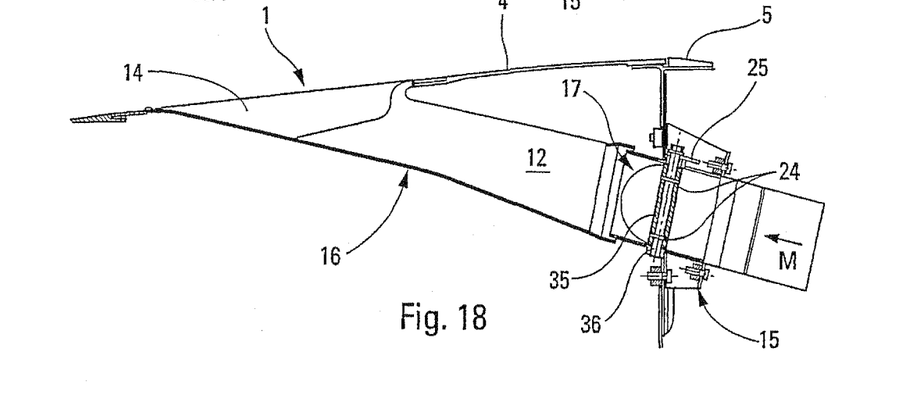
FIG. 18 is a section of the arrangement similar to FIG. 15, in a position allowing a minimum intake of ventilating air.

In this case, the height of the throttle valve 35 is substantially equal to the corresponding vertical dimension of the rectangular duct 12, while its width is less than the horizontal dimension of the duct, so as to allow a predetermined minimum air flow to pass both lateral sides of the wings 35A, 35B of the throttle valve toward the annular space, when it occupies the limit position illustrated in FIGS. 18 and 19, perpendicular to the duct, and a predetermined maximum air flow when it occupies the other limit position, merging with the duct, illustrated in FIGS. 15 and 16.

Structurally, this variant embodiment is similar to the preceding embodiment in that the throttle valve 35 is fixedly attached to a rotation shaft 36 supported by the side walls, in this case top and bottom 15B, 15C, of the diffuser 15 also attached to the rear of the portion 4 of the nacelle. At one of the ends of the rotary shaft 36, the lever 25 is arranged rotatably connected to the shaft and able to be rotatably controlled by the moving member 17A or 17B via the link 26.

The 90° rotation of the lever (angle AG, FIG. 17) operates that of the throttle valve 35 by means of the shaft 36 via the pins 24, which throttle valve may adopt either the position parallel to the duct (FIGS. 15 and 16), for which the cross section of the duct is maximal (since the wings 35A and 35B are in alignment with said duct) and allows a maximum air flow toward the devices of the annular space 11, via the diffuser 15 with double outlet 15A, or the position perpendicular to the duct (FIGS. 18 and 19) for which the cross section of the duct is minimal (since the wings of the throttle valve are perpendicular to said duct closing it partially) and allows a minimum air flow toward the annular space 11.

Naturally, irrespective of the embodiments used, any other intermediate position of the mobile element (flap, throttle valve) of the closing means 17 between the two limit positions is obtained thanks to the control means 17A and 17B to best modulate the desired ventilating air flow by varying the cross section of the duct, mainly as a function of the speed and altitude of the aircraft.

The invention claimed is:

1. A ventilating air intake arrangement of an aircraft nacelle that houses a turbine engine, comprising:
   at least one air duct in a structural wail of a front portion of the nacelle, wherein the at least one air duct connects to an air intake orifice;
   at least one confined zone between the nacelle and an outer casing of the turbine engine, wherein the at least one confined zone is connected to the at least one air duct and the air intake orifice, and the at least one confined zone is configured for outside air to enter upstream of the at least one air duct, through said air intake orifice, into said at least one air duct, and exit downstream of the at least one air duct toward said at least one confined zone;
   controllable flap configured to modify the flow of air entering the at least one confined zone by varying a cross section of the at least one air duct; and
   a control unit for controlling said controllable mobile element to vary the cross section of said at least one air duct, wherein said control unit comprises a variable volume reservoir:
   connected to said controllable flap, and
   in communication, by way of a conduit, with a pressure intake orifice on a forward facing surface of the nacelle that receives total pressure exerted by the outside air on said aircraft, with the control unit controlling the controllable mobile element to vary the cross section of said at least one air duct as a function of speed and altitude of said aircraft by fluidly transferring the pressure at the pressure intake orifice to the variable volume reservoir, thereby affecting the volume of the variable volume reservoir.

2. The arrangement as claimed in claim 1, wherein said variable volume reservoir is a cylinder-piston assembly.

3. The arrangement as claimed claim 1, wherein said total pressure is taken in via the pressure intake orifice placed in a vicinity of said air intake orifice.

4. The arrangement as claimed in claim 1, further comprising a stop to control at least one position of the controllable mobile element.

5. The arrangement as claimed in claim 1, wherein said controllable flap is positioned at said air intake orifice.

6. The arrangement as claimed in claim 1, wherein the controllable flap is an elastic plate, elastically deformed by said control unit.

* * * * *